United States Patent
Suyama et al.

(10) Patent No.: US 11,050,579 B2
(45) Date of Patent: Jun. 29, 2021

(54) DISTRIBUTION DESTINATION SPECIFYING DEVICE AND DISTRIBUTION DESTINATION SPECIFYING METHOD

(71) Applicant: YAMAHA CORPORATION, Hamamatsu (JP)

(72) Inventors: Akihiko Suyama, Hamamatsu (JP); Katsuaki Tanaka, Hamamatsu (JP); Takeyoshi Aihara, Hamamatsu (JP); Fukutaro Okuyama, Hamamatsu (JP); Kazuya Mushikabe, Hamamatsu (JP); Keisuke Tsukada, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 214 days.

(21) Appl. No.: 16/021,761

(22) Filed: Jun. 28, 2018

(65) Prior Publication Data
US 2018/0309589 A1   Oct. 25, 2018

Related U.S. Application Data

(63) Continuation of application No. PCT/JP2016/085271, filed on Nov. 29, 2016.

(30) Foreign Application Priority Data

Jun. 24, 2016   (WO) .................. PCT/JP2016/068836

(51) Int. Cl.
*H04L 12/28* (2006.01)
*H04N 21/436* (2011.01)
(Continued)

(52) U.S. Cl.
CPC .......... *H04L 12/2805* (2013.01); *G06F 3/165* (2013.01); *G06F 13/00* (2013.01);
(Continued)

(58) Field of Classification Search
None
See application file for complete search history.

(56) References Cited

U.S. PATENT DOCUMENTS

| 9,137,602 | B2 | 9/2015 | Mayman et al. |
| 9,654,821 | B2 | 5/2017 | Coburn, IV et al. |

(Continued)

FOREIGN PATENT DOCUMENTS

| JP | 2008182346 A | 8/2008 |
| JP | 2014042286 A | 3/2014 |

(Continued)

OTHER PUBLICATIONS

Extended European Search Report issued in European Appln. No. 16906356.7 dated Jan. 29, 2020.

(Continued)

*Primary Examiner* — Philip J Chea
*Assistant Examiner* — Hassan A Khan
(74) *Attorney, Agent, or Firm* — Rossi, Kimms & McDowell LLP

(57) ABSTRACT

A distribution destination specifying device includes: a related information obtaining portion that obtains related information that indicates a relationship of a plurality of host devices that distribute content to be input, to a client device; a selection receiving portion that receives a selection of one host device among the plurality of host devices; a related host device identifying portion that identifies a related host device related to a selected host device to be selected by the selection receiving portion, based on the related information; and a distribution destination specifying screen display portion that displays a distribution destination specifying screen for specifying a client device as a distribution destination of content of each of the selected host device and the related host device.

19 Claims, 11 Drawing Sheets

(51) Int. Cl.
   *H04N 21/485*   (2011.01)
   *G06F 13/00*    (2006.01)
   *G06F 3/16*     (2006.01)

(52) U.S. Cl.
   CPC .......... *H04L 12/28* (2013.01); *H04L 12/2812* (2013.01); *H04L 12/2827* (2013.01); *H04N 21/43615* (2013.01); *H04N 21/4852* (2013.01); *H04L 2012/2849* (2013.01)

(56) References Cited

U.S. PATENT DOCUMENTS

| | | | |
|---|---|---|---|
| 2008/0075295 A1* | 3/2008 | Mayman | G06F 13/36 381/79 |
| 2013/0174204 A1* | 7/2013 | Coburn, IV | H04N 21/8586 725/81 |
| 2013/0243199 A1* | 9/2013 | Kallai | A61C 7/30 381/17 |
| 2014/0178028 A1* | 6/2014 | Park | H04L 65/80 386/201 |
| 2014/0273859 A1* | 9/2014 | Luna | H04W 4/80 455/41.3 |
| 2014/0310597 A1* | 10/2014 | Triplett | G06F 3/04883 715/716 |
| 2018/0103080 A1* | 4/2018 | Girish | H04W 76/20 |

FOREIGN PATENT DOCUMENTS

| | | |
|---|---|---|
| JP | 2014128032 A | 7/2014 |
| JP | 2015510140 A | 4/2015 |

OTHER PUBLICATIONS

International Search Report issued in Intl. Appln. No. PCT/JP2016/068836 dated Jul. 19, 2016. English translation provided.

Written Opinion issued in Intl. Appln. No. PCT/JP2016/068836 dated Jul. 19, 2016.

International Search Report issued in Intl. Appln. No. PCT/JP2016/085271 dated Jan. 17, 2017. English translation provided.

Written Opinion issued in Intl. Appln. No. PCT/JP2016/085271 dated Jan. 17, 2017.

* cited by examiner

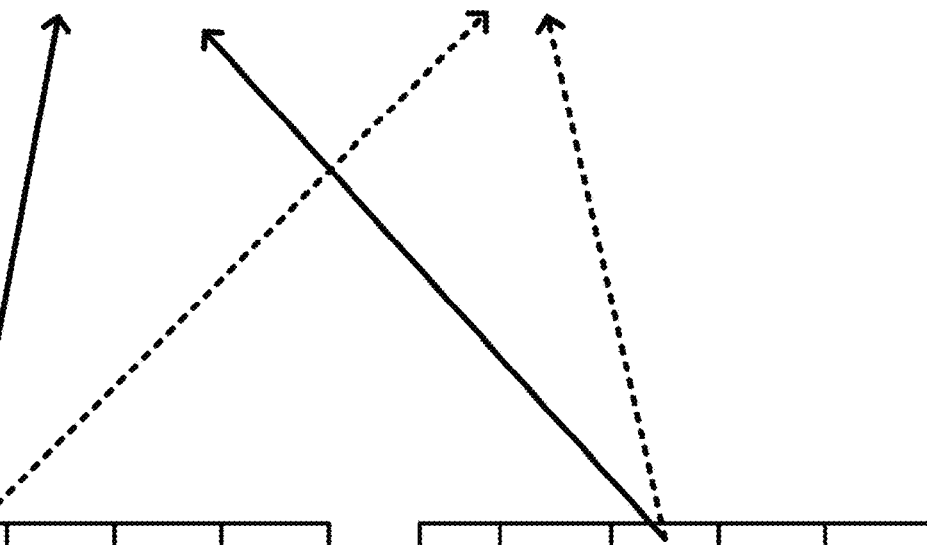

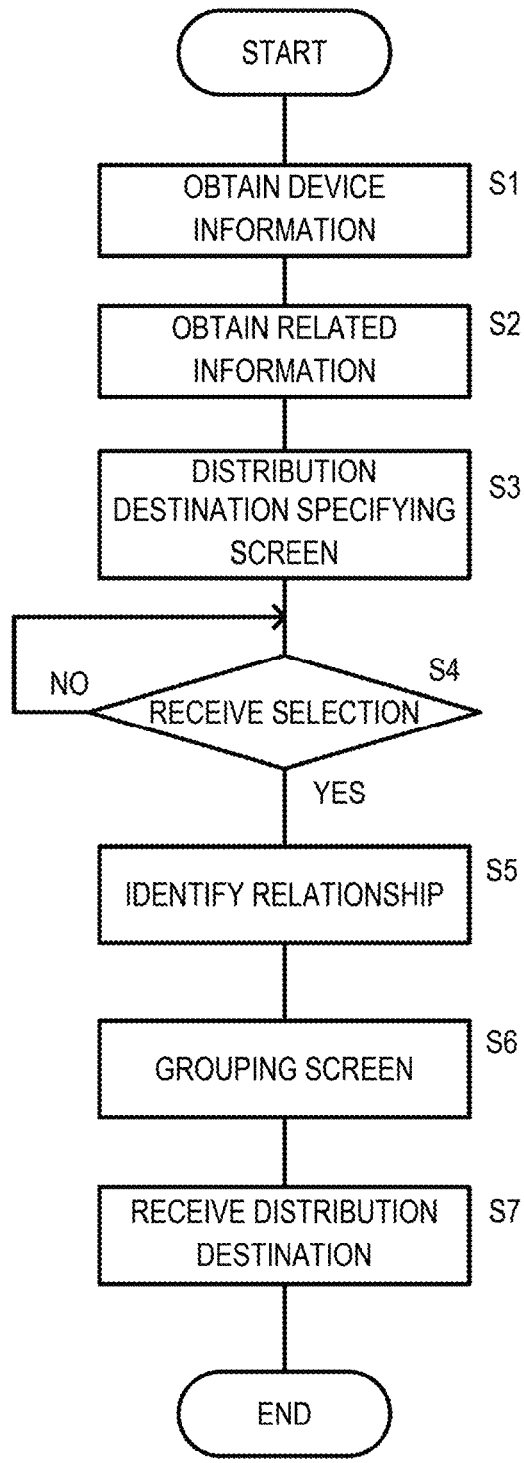

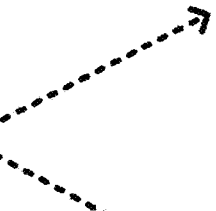

Fig.6A

| ROOM |
|---|
| Group G1 |
| Group G2 |
| Bedroom |
| Patio |
| COLLABORATIVE LINK |

Fig.6B

| ROOM | G1 |
|---|---|
| Bedroom | ☑ |
| Kitchen | ☐ |
| Livingroom | ☑ |
| OK | |

Fig.6C

| ROOM | G2 |
|---|---|
| Bedroom | ☐ |
| Kitchen | ☑ |
| Livingroom | ☐ |
| OK | |

Fig. 8A
Fig. 8B
Fig. 8C

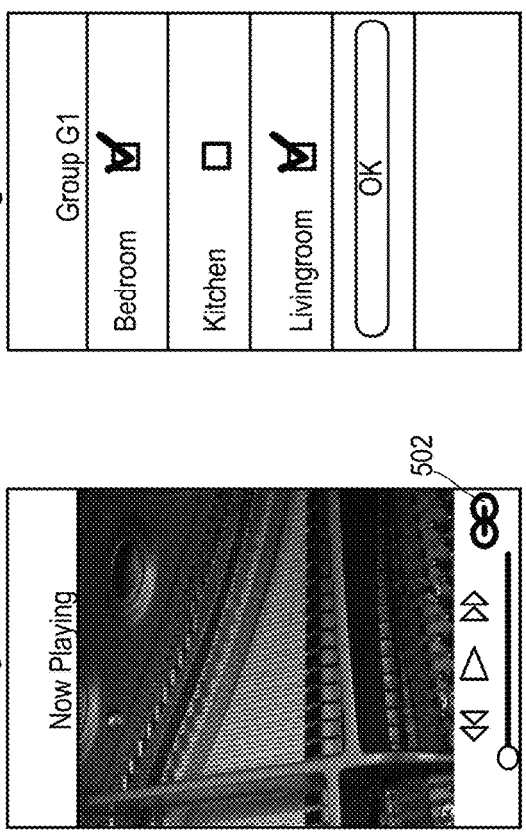

DISTRIBUTION DESTINATION SPECIFYING DEVICE AND DISTRIBUTION DESTINATION SPECIFYING METHOD

CROSS REFERENCE TO RELATED APPLICATIONS

The present application is a continuation application of International Patent Application No. PCT/JP2016/085271, filed on Nov. 29, 2016, which claims priority to International Patent Application No. PCT/JP2016/068836, filed on Jun. 24, 2016. The contents of these applications are incorporated herein by reference in their entirety.

BACKGROUND OF THE INVENTION

1. Field of the Invention

The present invention relates to a distribution destination specifying device and a distribution destination specifying method that specify a distribution destination of content to be distributed through a network.

2. Description of the Related Art

In Japanese Unexamined Patent Application Publication No. 2014-128032, a technique in which content is able to be synchronized and shared among a plurality of terminal devices connected to a network such as wireless LAN (Local Area Network) is disclosed. In Japanese Unexamined Patent Application Publication No. 2014-128032, one terminal device, when being tagged with other terminal devices while content is being played, transmits the content being played to the other terminal devices. As a result, the terminal device is able to share the content synchronized with a plurality of terminal devices.

Some terminal devices to be connected to a network may have a configuration in which a plurality of host devices are present and each host device distributes content to each client device. In such a configuration, each host device distributes related content distributed from the same device to each client device. In such a case, the use of the technique of Japanese Unexamined Patent Application Publication No. 2014-128032 makes it difficult to recognize with which terminal device a terminal device that plays content synchronizes and to which client device the content is distributed. As the number of terminal devices increases, it becomes more difficult to recognize a distribution destination of content.

SUMMARY OF THE INVENTION

The preferred embodiment of the present invention is to provide a distribution destination specifying device and a distribution destination specifying method that are able to easily recognize a distribution destination of content.

One aspect of the present invention is a distribution destination specifying device. The distribution destination specifying device is provided with a related information obtaining portion, a selection receiving portion, a related host device identifying portion, and a distribution destination specifying screen display portion. The related information obtaining portion obtains related information that indicates a relationship of a plurality of host devices that distribute content to be input, to a client device. The selection receiving portion receives a selection of one host device among the plurality of host devices. The related host device identifying portion identifies a related host device related to a selected host device to be selected by the selection receiving portion, based on the related information. The distribution destination specifying screen display portion displays a distribution destination specifying screen for specifying a client device as a distribution destination of content of each of the selected host device and the related host device.

The above and other elements, features, characteristics, and advantages of the present invention will become more apparent from the following detailed description of the preferred embodiments with reference to the attached drawings.

BRIEF DESCRIPTION OF THE DRAWINGS

FIG. 3A, FIG. 3B, FIG. 3C, and FIG. 3D are diagrams illustrating an example of a distribution destination specifying screen.

FIG. 4 is a flow chart illustrating a distribution destination specifying process that a portable terminal executes.

FIG. 5A, FIG. 5B, FIG. 5C, FIG. 5D, FIG. 5E, and FIG. 5F are diagrams illustrating an example of a distribution destination specifying screen.

FIG. 6A is a diagram illustrating an example of a dedicated button for shifting to a distribution destination specifying screen of a related host device, and FIG. 6B and FIG. 6C are diagrams illustrating an example of a distribution destination specifying screen.

FIG. 7A, FIG. 7B, and FIG. 7C are diagrams illustrating an example of the distribution destination specifying screen, and FIG. 7D is a diagram illustrating a confirmation screen.

FIG. 8A, FIG. 8B, and FIG. 8C are diagrams illustrating an example of a distribution destination specifying screen.

FIG. 10A, FIG. 10D, and FIG. 10F are diagrams illustrating an example of a playing screen, and FIG. 10B, FIG. 10C, and FIG. 10E are diagrams illustrating an example of a distribution destination specifying screen.

DETAILED DESCRIPTION

According to a preferred embodiment of the present invention, in a case in which a plurality of host devices are related to one another and a user selects one host device, a host device related to the selected host device is identified. Then, since a distribution destination specifying screen for specifying a client device as a distribution destination of the plurality of host devices is displayed, a user can more easily recognize a distribution destination, that is, to which client device content to be input to a host device is distributed.

Figure 1:
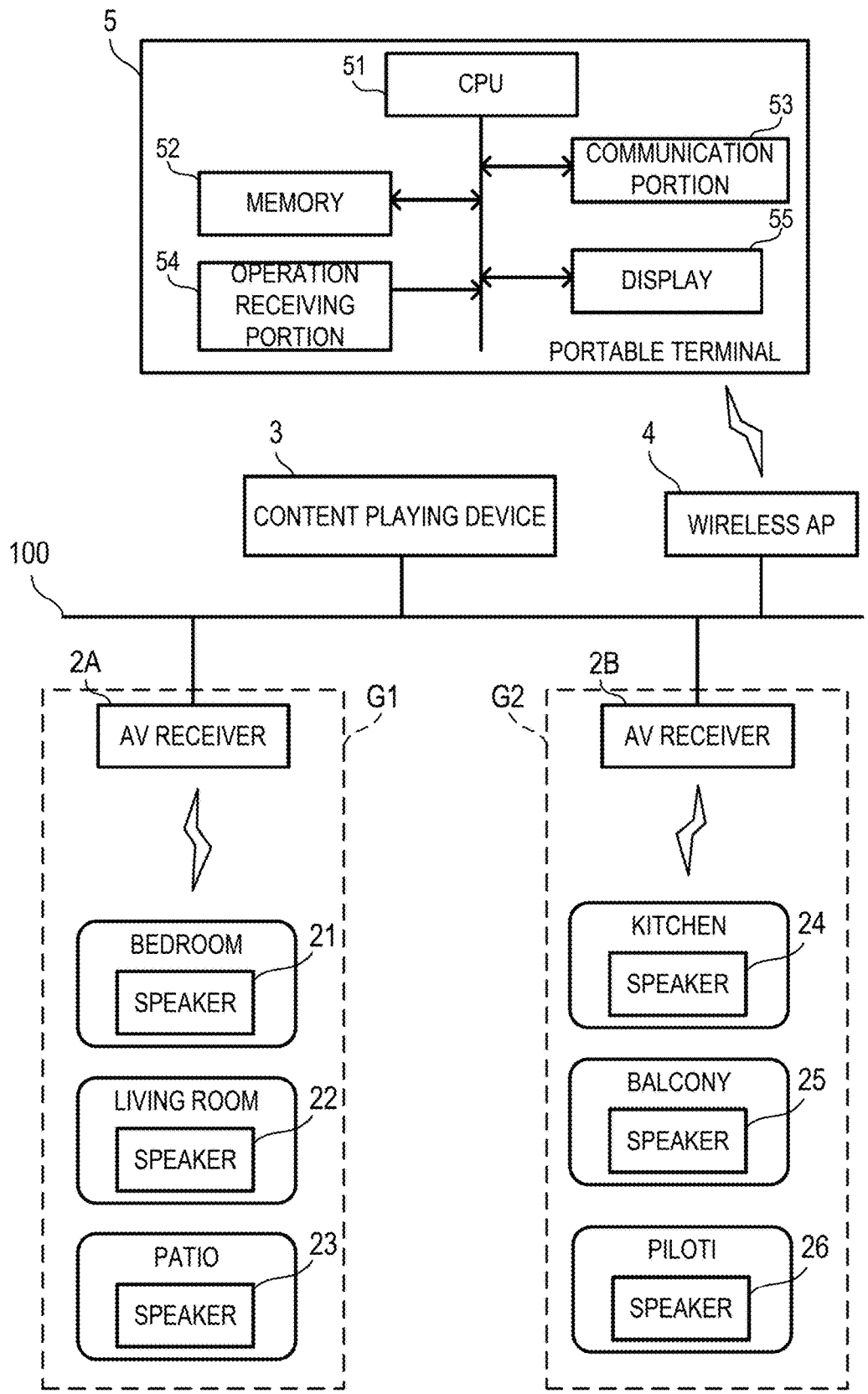
FIG. 1 is a diagram illustrating a configuration of an audio system according to a preferred embodiment.

FIG. 1 is a diagram illustrating a configuration of an audio system 1 according to a present preferred embodiment.

The audio system 1 is provided with an AV receiver 2A, an AV receiver 2B, a content playing device 3, a wireless access point (hereinafter referred to as a wireless AP) 4, and the like that are connected to a wired LAN 100 wiring in a building. Each of the devices such as the AV receivers 2A and 2B, the content playing device 3, and the like that are connected in the wired LAN 100 is arranged in a plurality of rooms such as a living room or a bedroom in a building.

The content playing device 3 plays content data including music data or video data. Examples of the content playing device 3 include a television, a disk player, a radio, a storage device that stores content data, or an automatic performance device. In the following, the content playing device 3 will be described as an automatic performance device, more specifically, as a musical instrument such as a piano capable of playing automatically.

Figure 2:
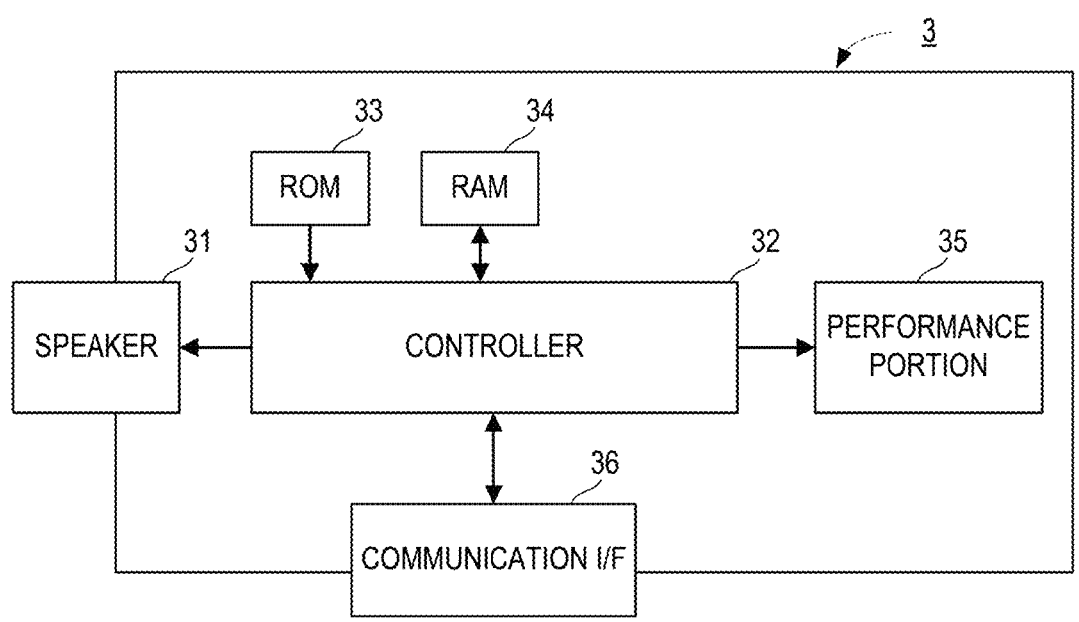
FIG. 2 is a block diagram illustrating a main configuration of a content playing device.

FIG. 2 is a block diagram illustrating a main configuration of the content playing device 3.

The content playing device 3 is provided with a speaker 31, a controller 32, a ROM 33, a RAM 34, a performance portion 35, and a communication I/F 36.

The communication I/F 36 is connected to the wired LAN 100. The content playing device 3 receives various types of control information from a portable terminal 5 through the communication I/F 36. The controller 32 performs various types of operations based on the received control information.

The controller 32 reads firmware (instructions) stored in the ROM 33 to the RAM 34, and performs a variety of tasks. The controller 32 follows sequence data on the basis of the MIDI standard, for example, causes a sound source (not illustrated) to be driven based on data of a melody part and an accompaniment part, and generates a digital audio signal. The generated digital audio signal is output from the speaker 31, for example, and is also output from the communication I/F 36 to the AV receivers 2A and 2B.

It is to be noted that the content playing device 3 also functions as an acoustic musical instrument that emits sound as each key is pressed. The performance portion 35, based on the sequence data on the basis of the MIDI standard, for example, causes a hammer installed corresponding to each key to be driven mechanically, and performs an automatic performance.

The wireless AP 4 constructs a wireless LAN. Then, the portable terminal 5 that a user owns is connected to the wireless AP 4. The portable terminal 5 is a laptop computer, a smartphone, a tablet terminal, or the like, and serves as a controller that operates each device in the audio system 1. The portable terminal 5 is an example of a "distribution destination specifying device" according to the present invention.

The portable terminal 5, as illustrated in FIG. 1, is provided with a CPU 51, a memory 52, a communication portion 53, an operation receiving portion 54, and a display 55. The communication portion 53 inputs and outputs a wireless signal in accordance with standards such as Wi-Fi (registered trademark) standards and Bluetooth (registered trademark) standard. This communication portion 53 enables the portable terminal 5 to communicate with the wireless AP 4.

The operation receiving portion 54 receives an operation by the user. The operation receiving portion 54 may be an operation button or may be a touch panel. The operation receiving portion 54 is an example of the "selection receiving portion" according to the present invention. It is to be noted that the CPU 51 may execute "selection receiving portion" task through operation receiving portion 54.

The display 55 displays various types of screens. The display 55 is an example of the "distribution destination specifying screen display portion" and the "client device display portion" according to the present invention. It is to be noted that the CPU 51 may execute these "distribution destination specifying screen display portion" and "client device display portion" tasks through the display 55.

The memory 52 is a RAM and a ROM. The memory 52 stores a program that the CPU 51 executes, a calculation processing result, information that the communication portion 53 receives, and the like. The CPU 51 reads a program (instructions) from the memory 52 and executes the read program.

In addition, the "related information obtaining portion," the "related host device identifying portion," the "selected host device instructing portion," the "related host device instructing portion," the "first client device information obtaining portion," the "second client device information obtaining portion," and the "prohibiting portion" according to the present invention are implemented when the CPU 51 executes the program stored in the memory 52. In other words, the CPU 51 implements the instructions stored the memory 52 and executes the "related information obtaining task," the "related host device identifying task," the "selected host device instructing task," the "related host device instructing task," the "first client device information obtaining task," the "second client device information obtaining task," and the "prohibiting task".

The CPU 51 displays a setting screen on the display 55. The user, by performing an operation according to the setting screen to be displayed, can specify a distribution destination of an audio signal to be output from the content playing device 3. The audio signal includes data (hereinafter referred to as melody data) of a melody part and data (hereinafter referred to as accompaniment data) of an accompaniment part. Then, the user operates the portable terminal 5 and can specify a distribution destination with respect to each type included in the audio signal. While described in detail later, the CPU 51 instructs the AV receivers 2A and 2B to distribute an audio signal to each speaker specified as a distribution destination.

The AV receivers 2A and 2B are connected to the wired LAN 100, and receive an audio signal input from the content playing device 3. The AV receivers 2A and 2B cause a speaker (not illustrated) connected to the own device, for example, to output sound on the basis of the input audio signal.

In addition, the AV receivers 2A and 2B construct a wireless LAN through a wireless router to be connected or a wireless communication function of the own device. Then, through the wireless network, a plurality of speakers 21 to 26 are connected to the AV receivers 2A and 2B. In FIG. 1, the speakers 21, 22, and 23 are connected to the AV receiver 2A, the speakers 24, 25, and 26 are connected to the AV receiver 2B, and the speakers 21 to 26 are arranged in various places in a building. In this example, the speaker 21 is installed in a bedroom. The speaker 22 is installed in a living room. The speaker 23 is installed in a patio. The speaker 24 is installed in a kitchen. The speaker 25 is installed in a balcony. The speaker 26 is installed in a piloti.

The user, by the operation from the portable terminal 5, can specify to which of the speakers 21 to 26 the melody data and the accompaniment data that are included in the audio signal to be output from the content playing device 3 are distributed.

In the following, a description will be given of a method for specifying a distribution destination of an audio signal by the portable terminal 5.

The user operates the portable terminal 5 and groups the speakers 21 to 26 into a first group G1 having the AV receiver 2A as a host device or a second group G2 having the AV receiver 2B as a host device. In the example illustrated in FIG. 1, a state in which, according to the operation of the user, the speakers 21, 22, and 23 are grouped into the first group G1, and the speakers 24, 25, and 26 are grouped into the second group G2 is illustrated.

The AV receiver 2A and the AV receiver 2B are related to each other, and a related audio signal is input to the AV receiver 2A and the AV receiver 2B. In the present preferred embodiment, the related audio signal includes melody data and accompaniment data that the content playing device 3 outputs. In other words, sound on the basis of the related audio signal is output to each of the first group G1 in which the AV receiver 2A is set as a host device and the second group G2 in which the AV receiver 2B is set as a host device.

In the following, an audio signal including only accompaniment data is to be input to the AV receiver 2A, and an audio signal including both melody data and accompaniment data is to be input to the AV receiver 2B. In such a case, only the accompaniment data is distributed to the speakers grouped into the first group G1. The melody data and the accompaniment data are distributed to the speakers grouped into the second group G2.

The accompaniment data to be input to the AV receiver 2A is an example of the "first content" of the present invention. The melody data and the accompaniment data to be input to the AV receiver 2B are an example of the "second content" of the present invention.

For example, in a case in which the content playing device 3 is installed in a living room, and each place of a bedroom and a patio are close to the living room, people who are present in each of these places can hear an acoustic sound output directly from the content playing device 3 or an electronic sound of the melody part. Therefore, when only an accompaniment sound is output to the bedroom, the living room, and the patio, the people who are present in each of these places can listen to both a melody sound and the accompaniment sound.

Then, the user groups the speakers 21, 22, and 23 into the first group G1. As a result, only the accompaniment data is distributed to the speakers 21, 22, and 23, and only the accompaniment sound is output to the living room, the bedroom, and the patio.

In a case in which each place of the kitchen, the balcony, and the piloti are away from the installation location (the living room) of the content playing device 3, the people who are present in each of these places cannot hear the acoustic sound or the electronic sound of the melody part that are output directly from the content playing device 3. Therefore, both the melody sound and the accompaniment sound are output to the kitchen, the balcony, and the piloti. Thus, the people who are present in each of these places can listen to both the melody sound and the accompaniment sound in the same manner as the people who are present in each place of the bedroom, the living room, and the patio.

Then, the user groups the speakers 24, 25, and 26 into the second group G2. As a result, both the melody data and the accompaniment data are distributed to the speakers 24, 25, and 26, and both the melody sound and the accompaniment sound are output to the kitchen, the balcony, and the piloti.

FIG. 3A, FIG. 3B, FIG. 3C, and FIG. 3D are diagrams illustrating an example of the distribution destination specifying screen.

FIG. 3A and FIG. 3B illustrate screens to be first displayed when a user performs an operation of reading a distribution destination specifying screen. On this screen, a list of selectable distribution destinations of a digital signal, such as "Group G1," "Group G2," "Bedroom," and "Patio," and the like is displayed. It is to be noted that the screens illustrated in FIG. 3A and FIG. 3B are the same but different in selected states.

On the screen illustrated in FIG. 3A and FIG. 3B, the "Group G1" indicates the first group G1 in which the AV receiver 2A serves as a host device, and the "Group G2" indicates the second group G2 in which the AV receiver 2B serves as a host device.

As described above, the AV receiver 2A and the AV receiver 2B, that is, the first group G1 and the second group G2 are related to each other. Then, even when the "Group G1" is selected as in FIG. 4A, or even when the "Group G2" is selected as in FIG. 3B, the screen of FIG. 3C is displayed.

As in FIG. 3A, in a case in which the "Group G1" is selected, the AV receiver 2A is an example of the "selected host device" according to the present invention, and the AV receiver 2B is an example of the "related host device" according to the present invention. As in FIG. 3B, in a case in which the "Group G2" is selected, the AV receiver 2B is an example of the "selected host device" according to the present invention, and the AV receiver 2A is an example of the "related host device" according to the present invention.

The screen of FIG. 3C is a grouping screen on which the speakers 21 to 26 are grouped and a distribution destination of a digital signal is to be specified. On this screen, the installation locations of the speakers 21 to 26 are displayed in a list, and the setting of grouping each of the locations into either of the first group G1 and the second group G2 is able to be performed.

For example, when the column of "G1" is checked at the item of "Bedroom," the speaker 21 of the bedroom is able to be grouped into the first group G1. In such a case, the AV receiver 2A is registered into the speaker 21 of the bedroom as a host device. Then, the distribution of an audio signal to the speaker 21 grouped into the AV receiver 2A is instructed to the AV receiver 2A.

In addition, when the column of "G2" is checked at the item of "Kitchen," the speaker 24 of the kitchen is able to be grouped into the second group G2. In such a case, the AV receiver 2B is registered in the speaker 24 of the kitchen as a host device. Then, the distribution of an audio signal to the speaker 24 grouped into the AV receiver 2B is instructed to the AV receiver 2B.

It is to be noted that, in a case in which the check of the column of "G1" is released and the column of "G2" is checked at the item of "Bedroom," the speaker 21 of the bedroom grouped into the first group G1 is grouped into the second group G2. In such a case, the AV receiver 2A registered into the speaker 21 of the bedroom as a host device is released and the AV receiver 2B is registered as a host device.

In addition, for example, in a case in which the speaker 21 of a bedroom is able to be grouped into both the first group G1 and the second group G2, both the column of "G1" and the column of "G2" are not able to be checked at the item of "Bedroom" on the screen of FIG. 3C. As a result, it is possible to prevent one speaker from being simultaneously grouped into different groups and different digital signals from being distributed to one speaker.

In this manner, the plurality of speakers 21 to 26 are able to be simultaneously grouped into two groups (the first group G1 and the second group G2) on one screen. Therefore, the user does not need to perform an operation of switching the screen for grouping into the first group G1 and the screen for grouping into the second group G2, and can easily group the speakers 21 to 26. Then, the user can recognize at a glance which speaker has been grouped into which group.

In addition, since the AV receivers 2A and 2B are able to be registered and deregistered to each of the speakers 21 to 26 as a host device on the screen of FIG. 3C, the user can save the time and effort of registering and deregistering as a host device to each of the speakers 21 to 26.

Further, while, on the screen of FIG. 3C, each of the speakers 21 to 26 to be grouped may be displayed by a device name, the user can more easily recognize the distribution destination of a digital signal by the displaying of an installation location.

It is to be noted that, while, as illustrated on the screen of FIG. 3D, the group name of "G1" and "G2" are displayed, a digital signal to be output may be displayed. On this screen, in place of the group name, a type of a digital signal to be distributed, that is, "ACC" and "melody+ACC" are displayed. ACC means accompaniment. Then, on this screen, the installation locations of the speakers 21 to 26 are displayed in a list, and the setting of either of outputting only the "ACC" or outputting the "melody+ACC" to each location is able to be performed. In such a case, compared with a case of displaying a group name of FIG. 3C, the user can more easily recognize which sound is output from which speaker.

It is to be noted that, while this example describes that the accompaniment data is input to the AV receiver 2A and the melody data and the accompaniment data are input to the AV receiver 2B, a type of a digital signal to be input to the AV receivers 2A and 2B may be able to be set on the screen of FIG. 3C or FIG. 3D, for example.

In this manner, when one group (the first group G1, for example) is selected, another group (the second group G2, for example) related to the one group is also able to be specified. Then, the distribution destination specifying screen in order to specify a speaker as a distribution destination of an audio signal, so that the user can more easily recognize a distribution destination, that is, to which speaker content to be input to the first group G1 and the second group G2 is distributed.

FIG. 4 is a flow chart illustrating a distribution destination specifying process that a portable terminal 5 executes.

The CPU 51 of the portable terminal 5 obtains device information (S1). The device information is information regarding a device connected to the wired LAN 100 and a device that is able to serve as a distribution destination of a digital signal. These devices include the AV receivers 2A and 2B, for example. The information of this device includes a device name, an installation location of a device, unique information (such as a MAC address and an IP address) that identifies a device, and information (client device information) of a device that is able to serve as a client device of a device. The device information may be stored in the memory 52 of the portable terminal 5 or may be stored in an external device. Examples of this external device include the content playing device 3, the AV receiver 2A, a server apparatus (not illustrated) to be connected from the wired LAN 100 through the Internet, and the like.

The CPU 51 obtains related information (S2). The related information is information that indicates a relationship of devices obtained in S1. The information that indicates the relationship of devices is, for example, information that relates devices to which the related audio signal is input. In the present preferred embodiment, the devices are the AV receiver 2A to which only the accompaniment data is input and the AV receiver 2B to which the melody data and the accompaniment data are input. The related information relates unique information by using unique information such as a MAC address or an IP address as information that relates related devices. The related information may be stored in the memory 52 or may be stored in an external device. Examples of this external device include the content playing device 3, the AV receiver 2A, a server apparatus (not illustrated) to be connected from the wired LAN 100 through the Internet, and the like.

The CPU 51 displays a distribution destination specifying screen on the display 55 (S3). In the present preferred embodiment, the CPU 51 displays screens illustrated in FIG. 3A and FIG. 3B. The CPU 51 determines whether or not the CPU 51 receives a selection made on the screen illustrated in FIG. 3A and FIG. 3B (S4). In a case of receiving no selection (S4: NO), the CPU 51 waits until receiving a selection.

In a case of receiving a selection (S4: YES), the CPU 51 specifies the relationship of the devices included in the device information obtained in S1 based on the related information obtained in S2 (S5). As described above, in this example, the AV receivers 2A and 2B are related to each other. Then, the CPU 51 displays a grouping screen illustrated in FIG. 3C or FIG. 3D on which the speakers 21 to 26 are grouped, even when either of the group name "G1" or the group name "G2" is selected (S6).

Then, the CPU 51, according to an operation of a user, receives specification of a distribution destination of a digital signal, and groups the speakers 21 to 26 into the first group G1 or the second group G2 (S7). At this time, the CPU 51 instructs output of the audio signal to the AV receivers 2A and 2B. In addition, the CPU 51 outputs a control signal that causes the AV receiver 2A or the AV receiver 2B to be registered as a host device, or a control signal that causes registration to be released, to selected speakers 21 to 26.

It is to be noted that, in S4, in a case in which the group name "G1" or "G2" is not selected and, for example, the "Bedroom" illustrated in FIG. 3A is selected, the CPU 51 performs a process in which the speaker 21 of the bedroom is specified as a distribution destination of a digital signal. At this time, a type of a digital signal to be distributed to the speaker 21 of the bedroom may be able to be set.

As described above, in the audio system 1 according to the present preferred embodiment, even when either of the related AV receivers 2A and 2B is selected, speakers that are able to be set to each of the AV receivers 2A and 2B as a client device are displayed so as to be selected. As a result, when a different digital signal is distributed to each group, the user, on one screen, can set a distribution destination to be set for each group and also recognize the distribution destination more easily.

It is to be noted that, while, in the present preferred embodiment, digital signals of which the content is different are caused to be output to the first group G1 and the second group G2, the same type of digital signals of which the sound quality is changed may be caused to be output. For example, the melody data and the accompaniment data with deep bass may be output to the first group G1, and the accompaniment data with a greater volume and the melody data with a smaller volume may be output to the second group G2.

In addition, the content playing device 3, although described as an automatic performance device, as described above, may be a disk player such as a DVD player, a television, or the like.

In such a case, sound of each channel of a digital sound may be output to the first group G1 and the second group G2.

For example, the sound of a front left channel and a front right channel may be output to the first group G1, and the sound of a surround left channel and a surround right channel may be output to the second group G2. In addition, for example, the original sound of a movie may be output to the first group G1, and the dubbed sound of a movie may be output to the second group G2.

In addition, while the groups are two in the present preferred embodiment, the number of groups may be three or more. In addition, while the client device as a distribution destination from the AV receivers 2A and 2B is the speakers 21 to 26, the client device may be any device capable of outputting sound, such as a television.

In addition, an additional device may be connected to the speakers 21 to 26 by wired or wireless communication. In such a case, on the screen illustrated in FIG. 3C, a device to be connected to the speakers 21 to 26 as a client device may preferably be configured not to be displayed. As a result, in a case in which a device connected to the speaker 21 grouped into the first group G1, for example, is installed at the installation location of a device grouped into the second group G2, a different digital signal is avoided being output to the second group G2.

While, in the present preferred embodiment, the host device is set to the AV receivers 2A and 2B and the client device is set to the speakers 21 to 26, the host device and the client device are not particularly limited to this. The host device may be any device capable of distributing an input audio signal to a device connected by wired or wireless communication. In addition, the client device may be any device capable of receiving an input of an audio signal from the device connected by wired or wireless communication and of emitting sound on the basis of the input audio signal.

Subsequently, FIG. 5A, FIG. 5B, FIG. 5C, FIG. 5D, FIG. 5E, and FIG. 5F are diagrams illustrating an example of a distribution destination specifying screen according to a second preferred embodiment. While, on the distribution destination specifying screen illustrated in FIG. 3A, FIG. 3B, FIG. 3C, and FIG. 3D, a plurality of host devices (the AV receiver 2A and the AV receiver 2B, for example) are registered or deregistered in one screen, on the distribution destination specifying screen according to the second preferred embodiment, a distribution destination specifying screen to each host device is displayed in a sequential order.

Figure 11:
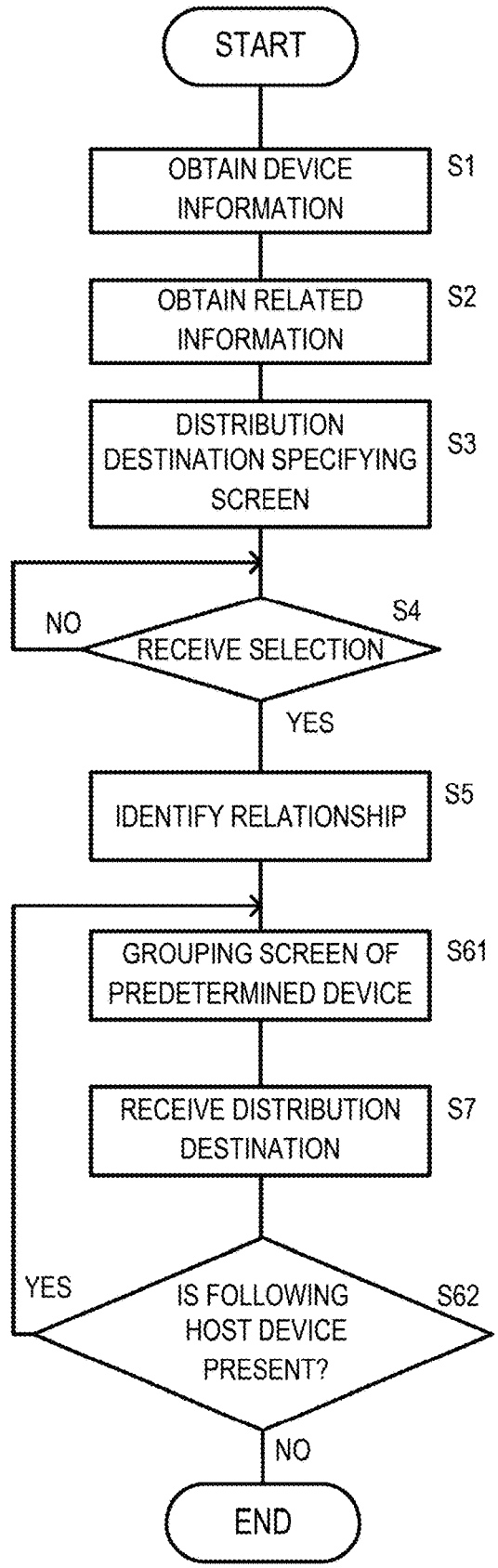
FIG. 11 is a flow chart illustrating a distribution destination specifying process that a portable terminal executes.

FIG. 11 is a flow chart (corresponding to the flow chart of the first preferred embodiment of FIG. 4) showing an operation of the portable terminal 5 according to the second preferred embodiment. As illustrated in FIG. 11, first of all, the portable terminal 5 shifts to the distribution destination specifying screen of a selected host device (S61) and receives the specification of a distribution destination (S7). Subsequently, the portable terminal 5 determines whether or not other host devices are present (S62) and shifts to the distribution destination specifying screen of the host devices (YES in S62). In a case in which the specification of a distribution destination is completed for all the host devices, the portable terminal 5 ends the operation. For example, in the example illustrated in FIGS. 5A to 5F, the "Group G1" indicates the first group G1 in which the AV receiver 2A serves as a host device, and the "Group G2" indicates the second group G2 in which the AV receiver 2B serves as a host device. According to the second preferred embodiment, as in FIG. 5A, when a user selects the "Group G1," the portable terminal 5, as illustrated in FIG. 5B, shifts to the distribution destination specifying screen of the AV receiver 2A. Subsequently, when the specification of a distribution destination is completed, the portable terminal 5, as illustrated in FIG. 5C, shifts to the distribution destination specifying screen of the AV receiver 2B.

It is to be noted that, as illustrated in FIG. 5C, the speaker (the "Bedroom" and the "Livingroom" in this example) that has already been specified as a distribution destination may not be able to be checked. As a result, it is possible to prevent one speaker from simultaneously belonging to a plurality of groups and to prevent different digital signals from being distributed to one speaker.

Although a selection operation may become difficult when a large number of related host devices (a large number of groups) are simultaneously displayed in one distribution destination specifying screen, in the second preferred embodiment, the distribution destination specifying screen to each host device is displayed in a sequential order, so that the selection operation becomes easy even when the number of related host devices increases.

In addition, in the second preferred embodiment, when the specification of a distribution destination of one host device is completed, the current screen continuously and automatically shifts to the distribution destination specifying screen of other host devices. In other words, in the second preferred embodiment, after the setting of the distribution destination of the AV receiver 2A is completed in FIG. 5B, the current screen does not return to the screen of FIG. 5A and shifts to the distribution destination specifying screen of the AV receiver 2B that is the following related host device. Therefore, the user does not need to perform an operation of switching the distribution destination specifying screen of the first group G1 and the distribution destination specifying screen of the second group G2. As a result, the operation amount of the user is reduced compared to conventional cases.

It is to be noted that, as in FIG. 5D, when the user selects the "Group G2," the portable terminal 5 shifts to the distribution destination specifying screen of the AV receiver 2B as illustrated in FIG. 5E. Subsequently, when the specification of a distribution destination is completed, as illustrated in FIG. 5F, the portable terminal 5 shifts to the distribution destination specifying screen of the AV receiver 2A.

However, the portable terminal 5 may shift to the distribution destination specifying screen of the AV receiver 2A illustrated in FIG. 5B even in a case in which the "Group G2" is selected, or may shift to the distribution destination specifying screen of the AV receiver 2B illustrated in FIG. 5E even in a case in which the "Group G1" is selected.

In addition, as a "Collaborative Link" button as illustrated in FIG. 6A, a dedicated button for shifting to the distribution destination specifying screen of a related host device may be prepared to receive a shift operation of instructing shift to a distribution destination specifying screen. In such a case, when a user selects the "Collaborative Link," the portable terminal 5 first shifts to the distribution destination specifying screen of the AV receiver 2A as illustrated in FIG. 6B. Subsequently, when the user completes the specification of a distribution destination, the portable terminal 5, as illustrated in FIG. 6C, shifts to the distribution destination specifying screen of the AV receiver 2B.

The order of display of related host devices may be displayed at random or in accordance with a predetermined rule. In such a case, the portable terminal 5, when receiving a shift operation by the selection of the "Collaborative Link" in accordance with a predetermined rule, selects any one host device among a plurality of host devices (the operation of selecting the host device corresponds to S4 of FIG. 11). The portable terminal 5 selects any one host device among a plurality of host devices, for example, based on the information that indicates order of priority included in the related information. In the present preferred embodiment, since, in the related information, the AV receiver 2A has the first priority and the AV receiver 2B has the second priority, the portable terminal 5 first shifts to the distribution destination specifying screen of the AV receiver 2A. Alternatively, the portable terminal 5, by using unique information such as a MAC address or an IP address, may shift to the distribution destination specifying screen in order from a device having a small number, for example. As a matter of course, the portable terminal 5 may receive a selection of any one host device among a plurality of host devices at random. However, since, in a case in which a selection is made at random, there is a possibility to shift to the distribution destination specifying screen of a different device each time when the user presses the "Collaborative Link" button, it is preferable to select any one host device in accordance with a predetermined rule.

It is to be noted that the portable terminal 5 may display a confirmation screen as illustrated in FIG. 7D after the setting of the distribution destination of all the devices is completed. Since, on a confirmation screen, each distribution destination of all the host devices is displayed, the user can recognize at a glance which speaker has been grouped into which group. It is to be noted that the confirmation screen may be displayed after the selection of each host device (or after the selection of the "Collaborative Link"). In such a case, the user can confirm the setting of the current distribution destination.

Figures 8A, 8B, 8C:
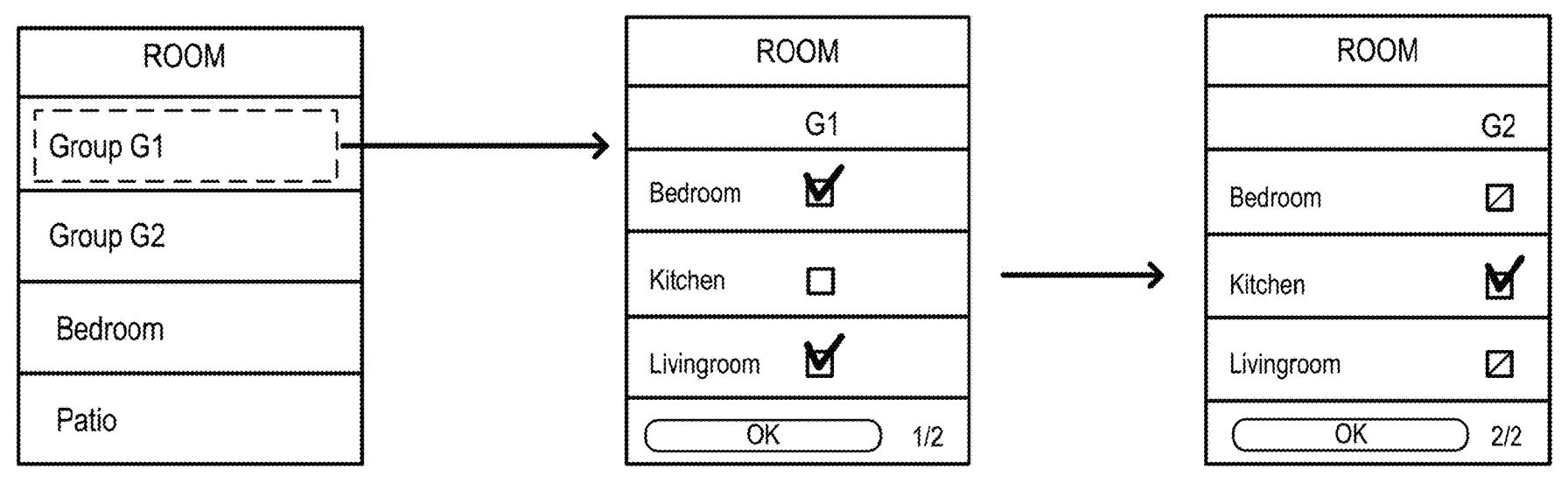

In addition, as illustrated in FIG. 8B and FIG. 8C, the portable terminal 5, in the distribution destination specifying screen, may display information that indicates what number of the host devices under the current setting is with respect to the number of all the host devices. For example, in the distribution destination specifying screen of the AV receiver 2A, as illustrated in FIG. 8B, by the display of "½," the user can confirm that the number of all the host devices is two and the screen is currently the distribution destination specifying screen of the first device.

Figure 9A:
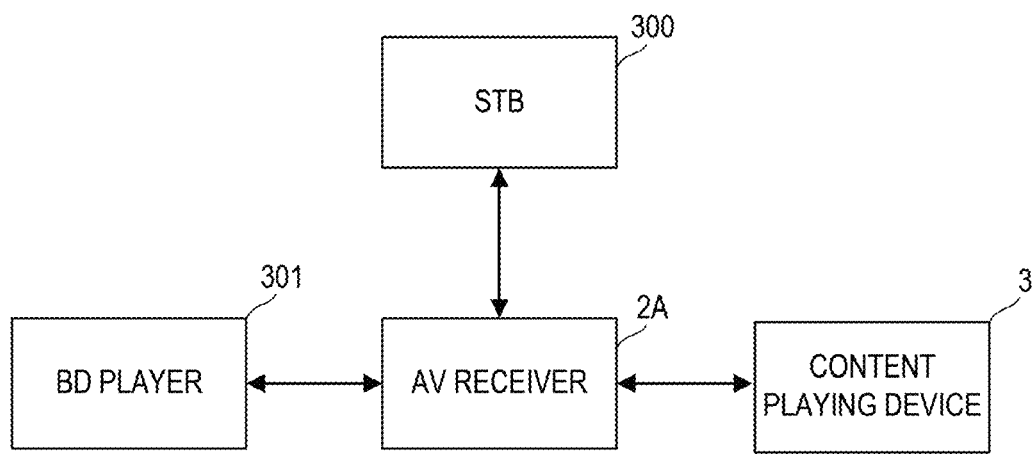
FIG. 9A is a block diagram illustrating a configuration of an audio system and FIG. 9B is a block diagram illustrating a configuration of an AV receiver 2A.
Figure 9B:
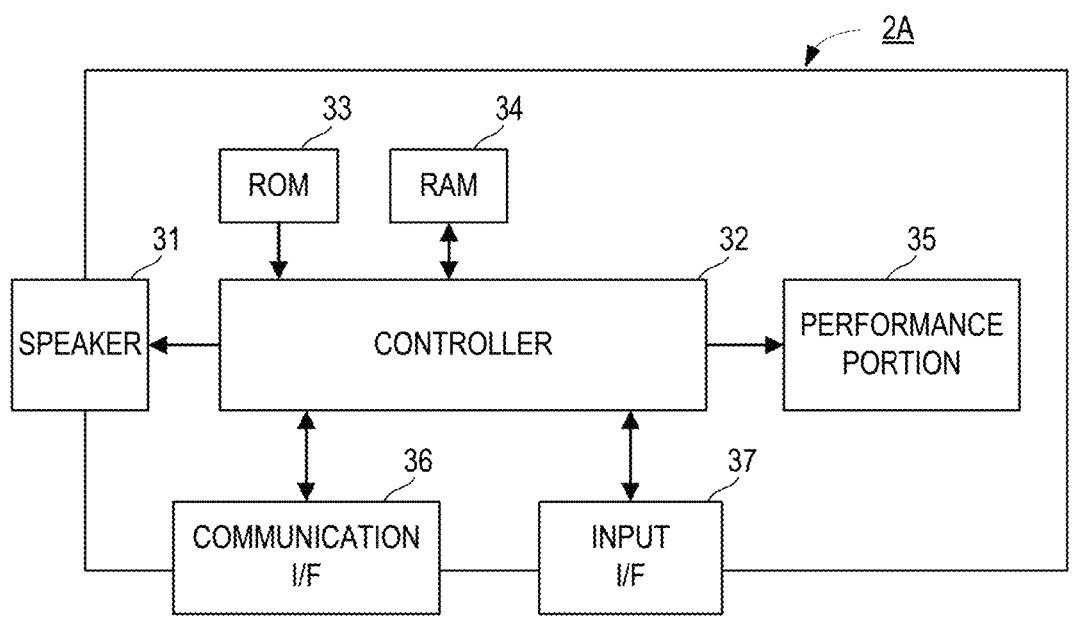

Subsequently, FIG. 9A is a block diagram illustrating a configuration of an audio system in a case in which a plurality of devices are connected to the AV receiver 2A and there are a plurality of input destinations. FIG. 9B is a block diagram illustrating a configuration of the AV receiver 2A. The AV receiver 2A, while having the same configuration and the same function as the content playing device 3, further includes an input I/F 37 in this example.

While, in the example of FIG. 1, an example in which the AV receiver 2A and the AV receiver 2B each have the content playing device 3 as an input destination and receive an input of an audio signal from the content playing device 3 is illustrated, in this example, the AV receiver 2A (or the AV receiver 2B) inputs an audio signal from a plurality of devices and plays predetermined content by switching an input destination.

The input I/F 37 has a plurality of interfaces such as an HDMI (registered trademark) terminal, a USB terminal, a digital audio terminal, or an analog audio terminal. In addition, the input I/F 37 also includes a short range network communication interface such as Bluetooth (registered trademark) or NFC.

To the AV receiver 2A, a STB (set top box) 300 and a BD player 301 are connected and the content playing device 3 is also connected. The user operates the user interface (not illustrated) of the AV receiver 2A or the portable terminal 5, and can switch the input destination to either of the STB 300, the BD player 301 or the content playing device 3.

Then, in this example, the portable terminal 5 transmits instruction information for changing an input destination, to each of the host devices. In other words, the CPU 51 of the portable terminal 5 functions as an instruction information transmitting portion. The instruction information, on the distribution destination specifying screen, for example, is transmitted when the user completes the specification of a distribution destination. For example, on the distribution destination specifying screen of the AV receiver 2A as illustrated FIG. 5B, when the user presses an "OK" button, the portable terminal 5 transmits the instruction information for changing the input destination to the content playing device 3, to the AV receiver 2A. The AV receiver 2A changes the input destination to the content playing device 3 based on the received instruction information. In addition, on the distribution destination specifying screen of the AV receiver 2B as illustrated FIG. 5C, when the user presses the "OK" button, the portable terminal 5 transmits the instruction information for changing the input destination to the content playing device 3, to the AV receiver 2B. The AV receiver 2A and the AV receiver 2B change the input destination to the content playing device 3 based on the received instruction information.

As a result, even in a case in which the AV receiver 2A, setting a different device (the BD player 301, for example) as an input destination, has been playing the audio signal of the different device and has also been set as a host device that distributes the audio signal input from the content playing device 3, the AV receiver 2A is able to automatically switch the input destination to the content playing device 3.

It is to be noted that the transmission timing of the instruction information is not limited to the case in which the specification of a client device as a distribution destination to each host device is completed. For example, the timing may be a case in which the specification of a client device as a distribution destination to all the host devices is completed. However, the user can confirm that specification processing has been made appropriately since the input destination is switched when the specification of each host device is completed.

Subsequently, FIG. 10A is a diagram illustrating an example of a play screen (Now Playing screen) of the content playing device 3. The play screen is displayed in the portable terminal 5. The play screen is a screen that displays album art and the like of the content being played. In addition, the play screen is a screen on which a user performs an operation such as change in volume, stop playing, specification of a play position, or the like. In a case in which a user performs an operation such as change in volume, stop playing, specification of a play position, or the like, the portable terminal 5 transmits information related to these operations to a target device (the content playing device 3 in this example). The target device performs change in volume, playing stop, or instructions of a playing position according to the received information.

The portable terminal 5 displays a symbol image 502 corresponding to the above described "Collaborative Link" on the play screen. The portable terminal 5, in a case in which the symbol image has been selected on the play screen, shifts to a distribution destination specifying screen, as illustrated in FIG. 10B and FIG. 10C. The portable terminal 5, as described above, in accordance with a predetermined rule such as priority, shifts to the distribution destination specifying screen of the AV receiver 2A as illustrated in FIG. 10B, for example. Subsequently, when the user completes the specification of a distribution destination, the portable terminal 5, as illustrated in FIG. 10C, shifts to the distribution destination specifying screen of the AV receiver 2B.

On the other hand, FIG. 10D is a diagram illustrating an example of a play screen of the AV receiver 2A. As illustrated in FIG. 10D, the portable terminal 5, also on the play screen of the AV receiver 2A (or the AV receiver 2B) being a host device, may display a symbol image 503. However, in a case in which the symbol image 503 is specified on the play screen of the AV receiver 2A being a host device and the portable terminal 5 shifts to the distribution destination specifying screen as illustrated in FIG. 10E, after the user completes the specification of a distribution destination, the portable terminal 5, as illustrated in FIG. 10F, returns to the play screen again and does not shift to the distribution destination specifying screen of another host device.

In this manner, the portable terminal 5, in a case of having received instructions for shifting to a distribution destination specifying screen on the play screen of a device that outputs an audio signal to a plurality of related host devices, like the content playing device 3, may display the distribution destination specifying screen of the plurality of related host device in a sequential order and may display only the distribution destination specifying screen of each device in a case of having received instructions for shifting to the distribution destination specifying screen on the play screen of a device to which an audio signal of the AV receiver 2A and the like is input.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A portable terminal for distributing contents for sounding a music performance that includes a melody part for producing melody sound and an accompaniment part for producing accompaniment sound associated with the melody part, to at least one of a plurality of client devices from a plurality of host devices associated therewith, the portable terminal comprising:
   a memory storing instructions; and
   a processor that implements the instructions to execute a plurality of tasks, including:
      a related information obtaining task that obtains related information that indicates relationships among the plurality of host devices, the related information including unique identifying information for each of the plurality of host devices;
      a selection receiving task that receives a selection of a host device, among the plurality of host devices;
      a related host device identifying task that identifies a related host device, among the plurality of host devices, related to the selected host device based on the obtained related information,
         wherein the selected host device and the identified related host device each output at least one of the melody sound from the melody part or the accompaniment sound from the accompaniment part; and
      a screen displaying task that displays a distribution destination specifying screen for specifying at least one client device as a distribution destination of content that includes at least one of the melody part or the accompaniment part from each of the selected host device and the identified related host device,
         wherein one of the selected host device or the related host device distributes one of the melody part or the accompaniment part to a specified first client device, and
         wherein the other of the selected host device or the related host device distributes both the melody part and the accompaniment part to a specified second client device.

2. The distribution destination specifying device according to claim 1, wherein the screen displaying task displays the distribution destination specifying screen of each of the plurality of host devices in a sequential order.

3. The distribution destination specifying device according to claim 1, wherein the screen displaying task displays the distribution destination specifying screen of a following host device in a sequential order, after completing specifying of the at least one client device as the distribution destination of each of the plurality of host devices.

4. The distribution destination specifying device according to claim 1, wherein the plurality of tasks include an instruction information transmitting task that transmits instruction information for changing an input destination of each of the plurality of host devices.

5. The distribution destination specifying device according to claim 4, wherein the instruction information transmitting task transmits the instruction information after completing specifying of the client device as the distribution destination of each of the plurality of host devices.

6. The distribution destination specifying device according to claim 1, wherein the selection receiving task receives:
   a shift operation of instructing a shift to the distribution destination specifying screen; and
   a selection of one of the plurality of host devices according to a predetermined rule in a state of receiving the shift operation.

7. The distribution destination specifying device according to claim 1, wherein:
   the selection receiving task receives a selection of the specified first and second client devices as distribution destinations of content of the selected host device and the identified related host device in the distribution destination specifying screen; and
   the plurality of tasks include:
      a selected host device instructing task that instructs the selected one host device to distribute the respective content to the one of the specified first or second client device as one distribution destination; and
      a related host device instructing task that instructs the identified related host device to distribute the respective content to the other of the specified first or second client device as another distribution destination.

8. The distribution destination specifying device according to claim 7, wherein:
   the selected host device instructing task instructs the selected host device to distribute the melody part to the specified first client device, and
   the related host device instructing task instructs the identified related host device to distribute both the melody part and the accompaniment part to the specified second client device.

9. The distribution destination specifying device according to claim 1, wherein the plurality of tasks include:

a first client device information obtaining task that obtains first client device information that is able to be set to the selected host device;

a second client device information obtaining task that obtains second client device information that is able to be set to the identified related host device; and a client device display task that groups the obtained first and second client device information into the selected host device and the identified related host device, and displays the first and second client device information on the distribution destination specifying screen.

10. The distribution destination specifying device according to claim 9, wherein the plurality of tasks include a prohibiting task that, in a case where the obtained first client device information is same as the obtained second client device information, prohibits the same client device information from being simultaneously specified to the at least one client device as the distribution destination of content of each of the selected host device and the identified related host device.

11. The distribution destination specifying device according to claim 9, wherein the obtained first and second client device information include installation place information of associated client devices.

12. The distribution destination specifying device according to claim 1, wherein the screen displaying task displays content details to be input to the selected host device and the identified related host device.

13. The distribution destination specifying device according to claim 1, wherein the contents to be input to the selected host device and the identified related host device are output from an automatic performance device.

14. A distribution destination specifying method for a portable terminal for distributing contents for sounding a music performance that includes a melody part for producing melody sound and an accompaniment part for producing accompaniment sound associated with the melody part, to at least one of a plurality of client devices from a plurality of host devices associated therewith, the method comprising:

obtaining related information that indicates a relationship among the plurality of host devices, the related information including unique identifying information for each of the plurality of host devices;

receiving a selection of a host device, among the plurality of host devices;

identifying a related host device, among the plurality of host devices, related to the selected host device based on the obtained related information, wherein the selected host device and the identified related host device each output at least one of the melody sound from the melody part or the accompaniment sound from the accompaniment part; and displaying a distribution destination specifying screen for specifying at least one client device as a distribution destination of content that includes at least one of the melody part or the accompaniment part from each of the selected host device and the identified related host device, wherein one of the selected host device or the related host device distributes one of the melody part or the accompaniment part to a specified first client device, and wherein the other of the selected host device or the related host device distributes both the melody part and the accompaniment part to a specified second client device.

15. The distribution destination specifying method according to claim 14, wherein the displaying displays the distribution destination specifying screen of each of the plurality of host devices in a sequential order.

16. The distribution destination specifying method according to claim 14, the displaying displays the distribution destination specifying screen of a following host device in a sequential order, after completing specifying of the at least one client device as the distribution destination of each of the plurality of host devices.

17. The distribution destination specifying method according to claim 14, further comprising transmitting instruction information for changing an input destination of each of the plurality of host devices.

18. The distribution destination specifying method according to claim 17, wherein the transmitting transmits the instruction information after completing specifying of the client device as the distribution destination of each of the plurality of host devices.

19. The distribution destination specifying method according to claim 14, further comprising receiving:

a shift operation of instructing a shift to the distribution destination specifying screen; and a selection of one of the plurality of host devices according to a predetermined rule in a state of receiving the shift operation.

* * * * *